Patented Feb. 5, 1935

1,990,274

UNITED STATES PATENT OFFICE 1,990,274

POLARIZING ELECTROLYTE

Philip E. Edelman, Chicago, Ill., assignor, by mesne assignments, to Robert T. Mack, trustee, Chicago, Ill.

No Drawing. Application September 3, 1929, Serial No. 390,207

5 Claims. (Cl. 175—315)

My present invention relates to polarizing electrolyte mixtures suitable for use, among other purposes, as polarizing electrolyte material for dry type high voltage electrochemical condensers.

My electrolyte mixture is a departure in this art, in that, it consists essentially of a cement-like composition which tends to harden into a solid-like electrically conductive mixture. Generically the mixture is composed of, firstly, a suitable syrup or solvent material, such for example, as glycerine; secondly, any suitable gum, such as gum arabic dissolved or dispersed therein; and, thirdly, a suitable powdered material containing combined or entrained oxygen capable of combining physically or chemically with the aforesaid ingredients to form a cement-like composition which tends to harden or set with time, such, for example, as aluminum or zinc oxide, or any other suitable oxide or powdered molybdate, or charcoal, which latter contains entrained oxygen. Also, where desired, the third or powdered ingredient may itself consist of a mixture of two or more powders of relatively poor electrical conductivity, such for example as a mixture of different powdered oxides, including preferably magnesium oxide, barium oxide, and/or other assisting powder material of like general characteristics. I have determined that the relative proportions of the third powdered ingredient dispersed or combined with the first named two ingredients is unimportant as well as the exact composition of the powder used, as long as suitable powders are selected, such as are capable of forming a cement-like mass with the aforesaid, first two named ingredients, and are used in the stated manner which does not detrimentally affect the electrical conductivity of the mixed mass electrolyte. Since there are numerous chemical equivalents of like general nature and characteristics readily familiar to persons skilled in this art, I am stating a suitable exemplification of a composition of this new class without limiting myself to the exact ingredients or proportions except as set forth in the appended claims. An exemplification of this cement is, parts by weight:

Glycerine _____ 10 parts
Powdered gum arabic_____ 3 to 4 parts
Aluminum oxide, or other oxygen containing powder_____Sufficient to form a cement The glycerine and gum arabic are preferably prepared together in a hot solution to which the oxide powder is added and stirred to be dispersed therein to form a cement. The cement may be poured or impregnated or coated on any suitable surfaces or fibrous material in customary manner and will thereafter tend to set or harden into an electrically conductive electrolyte mixture suitable for use in polarized high voltage electrochemical condensers. It may be remarked that the electrolyte material or glycerine is, in effect, characterized by a thickened consistency upon the addition thereto of said powders.

The cement-like electrolyte mixture has added utility, in that, it tends to adhere firmly to surfaces to which it is applied, is able to withstand higher operating voltages and higher operating temperatures, has the desirable characteristic of lower electrical losses, and tends to stabilize and maintain uniform operating characteristics. Thus, in contradistinction to the performance of a mixture in which the cementing powder is omitted, the time required for polarizing action to reform in a condenser employing the cement-like electrolyte mixture is normally only a few seconds instead of fifteen or more seconds formerly required. It may be remarked that the cementing powder element probably also functions to exclude moisture from the electrolyte mass. The electrolyte mixture may be applied or coated on fibrous material in a usual manner so as to render the same suitable for use as a spacer sheet with film-formed aluminum electrodes.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. A polarizing electrolyte mixture consisting of gum arabic, an electrically conductive glycerine therefor, and powdered oxide material dispersed therewith to form a substantially solid mass upon setting.

2. As an electrolyte mixture, in combination, an electrically conductive glycerine liquid containing gum arabic and a powder containing oxygen dispersed therewith to form a cement-like mass.

3. An electrolyte mixture comprising glycerine thickened by a cementing powder containing oxygen dispersed therein in sufficient quantity to form a rigid cement-like mass.

4. A polarizing electrolyte containing a syrup such as glycerine, a gum such as gum arabic, and a hardening agent containing oxygen such as a metallic oxide of relatively poor electrical conductivity, characterizing a product with the properties of a cement.

5. A polarizing electrolyte containing a syrup such as glycerine ten parts, a gum such as gum arabic three to four parts, and a hardening agent containing oxygen such as a metallic oxide of relatively poor electrical conductivity sufficient to form a cement.

PHILIP E. EDELMAN.